US006799349B2

(12) United States Patent
Stouder, II

(10) Patent No.: US 6,799,349 B2
(45) Date of Patent: Oct. 5, 2004

(54) COMBINED WINDSHIELD WIPER AND BRUSH ASSEMBLY

(76) Inventor: Lloyd E. Stouder, II, 209 Flowerwood Ct., Brentwood, TN (US) 37027

(*) Notice: Subject to any disclaimer, the term of this patent is extended or adjusted under 35 U.S.C. 154(b) by 0 days.

(21) Appl. No.: 10/463,412

(22) Filed: Jun. 18, 2003

(65) Prior Publication Data

US 2003/0229960 A1 Dec. 18, 2003

Related U.S. Application Data

(60) Provisional application No. 60/389,454, filed on Jun. 18, 2002.

(51) Int. Cl.⁷ ............................. B60S 1/28; B60S 1/38
(52) U.S. Cl. ............... 15/250.41; 15/250.4; 15/250.451
(58) Field of Search ................. 15/250.451, 250.4, 15/250.41, 250.04, 250.03, 250.361

(56) References Cited

U.S. PATENT DOCUMENTS 2,648,865 A * 8/1953 Gordon et al. ........... 15/250.04
2,918,689 A * 12/1959 Pruett .................... 15/250.04
3,939,524 A 2/1976 Knights
4,060,872 A * 12/1977 Bucklitzsch ............. 15/250.04
4,327,457 A * 5/1982 Lunsford ................. 15/250.03
4,339,839 A 7/1982 Knights
4,754,517 A * 7/1988 Aldous .................... 15/250.04
5,778,483 A * 7/1998 Dawson ................... 15/250.04

FOREIGN PATENT DOCUMENTS

GB          2124477    * 2/1984    ............ 15/250.04

* cited by examiner

Primary Examiner—Gary K Graham
(74) Attorney, Agent, or Firm—Roylance, Abrams, Berdo & Goodman, L.L.P.

(57) ABSTRACT

An improved windshield wiper is described having a pair of squeegees and a brush disposed between said squeegees. The frame of the wiper includes openings along the frame back and longitudinally extending members arm engaging members that are adapted to create a vacuum when the vehicle is moving. The brush spine is preferably perforated such that fluid is drawn from the windshield, into the brush bristles and out through the brush spine perforations and openings, when air passing over the wiper causes a vacuum between said squeegees.

9 Claims, 1 Drawing Sheet

COMBINED WINDSHIELD WIPER AND BRUSH ASSEMBLY

The present invention claims benefit under 35 U.S.C. §119(e) from U.S. Provisional Application Ser. No. 60/389,454 filed on Jun. 18, 2002, the contents of which are hereby incorporated by reference in their entirety.

FIELD OF THE INVENTION

The present insertion relates to motor vehicle windshield wipers. In particular, the present invention relates to windshield wipers that incorporate brushes.

BACKGROUND OF THE INVENTION

Windshield wipers are an important safety feature in automobiles, trucks, buses, trains, and any other vehicle that includes an windshield and is subject to rain, snow, ice, insects, tree sap, dirt, mud, and the like. Windshield wipers typically include a longitudinal frame and one or more flexible squeegees running along the length of the frame. The frame is usually held by a motorized arm that sweeps the wiper across the windshield with the squeegee in contact with the windshield surface in order to sweep away rain, snow, and other debris so that the driver has a clear view in front of their vehicle.

Many vehicles also include a mechanism for providing cleaning fluid to the windshield. When the windshield becomes dirty, the driver causes cleaning fluid to be projected onto the windshield, and the wipers mechanically assist in the cleaning action. Cleaning fluid may be provided from a nozzle on or near the hood of the vehicle, or otherwise in proximity to the outside. windshield surface. Or, some vehicles and after-market kits make it possible to provide cleaning fluid directly through the windshield wiper frame. In this way, the cleaning fluid is deposited directly to the windshield, and is less likely to be blown away from the vehicle by wind when the vehicle is moving, and is also advantageously distributed more widely across the windshield surface as the wipers sweep.

However, even with today's windshield wipers, ice, dirt, insects and other debris can collect on the windshield despite the sweeping action of the windshield wiper, obscuring the driver's view. As a result, drivers occasionally are required to stop their vehicle, and clean stubborn debris from the windshield, in order to improve visibility through the windshield.

Additionally, although some modern windshield wipers take advantage of aerodynamics in order to maintain contact between the windshield surface and the wiper blades, they do not take advantage of the wind available at moderate to high vehicle speeds to assist in the distribution of cleaning fluids and the removal of liquids from the windshield surface.

The invention described herein provides an improved windshield wiper that more effectively removes solid and liquid debris from the windshield, allowing for improved visibility, and thereby increased safety.

SUMMARY OF THE INVENTION

Embodiments of the present invention include a windshield wipers comprising a longitudinal frame having front and back sides. The frame is adapted to engage at least two longitudinally extending flexible squeegees and a longitudinally extending brush having a perforated spine disposed between the two squeegees along the front side of the frame. The frame also comprises openings along the back of the frame adjacent to the perforations in the brush spine. A pair of arm engaging members are included along the back side of the frame on either side of the openings to assist in creating vacuum pressure. The vacuum pressure advantageously directly liquid from the windshield, through the brush bristles and out the opening in the back of the frame.

BRIEF DESCRIPTION OF THE DRAWINGS

The invention will be more readily understood with reference to the embodiments illustrated in the attached drawing figures, in which.

In the drawing figures, it will be understood that like numerals refer to like features and structures.

DETAILED DESCRIPTION OF THE PREFERRED EMBODIMENTS

Figure 1:
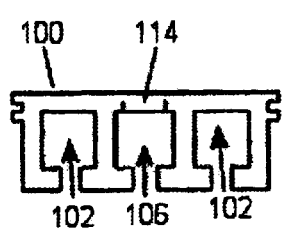
FIG. 1 is a cross section of a frame of a windshield wiper in accordance with an embodiment of the present invention.
Figure 2:
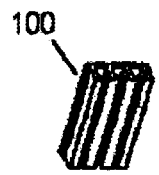
FIG. 2 is a perspective view of a frame of a windshield wiper in accordance with an embodiment of the present invention.

The preferred embodiments of the invention will now be described with reference to the attached drawing figures. FIG. 1 shows a cross section of a frame 100 according to an embodiment of the invention. The frame is formed with two channels 102 in the bottom adapted to engage longitudinally disposed squeegees 104 (not shown). The frame as shown also has a third channel 106 between the first two channels adapted to engage a longitudinal brush 108. FIG. 2 is a perspective view of the frame without the squeegees or brush. Frame 100 is preferably made of plastic, rubber, nylon, ABS, or any other suitable material. Frame 100 also preferably has a uniform cross section, advantageously enabling the frame to be manufactured using an extrusion process. Those of skill in the art will readily appreciate that any material capable of being formed into a frame is considered to be within the scope of the present invention, and plastic, nylon and the like are merely exemplary materials. Aluminum, steel and other metals could also be used.

Figure 3:
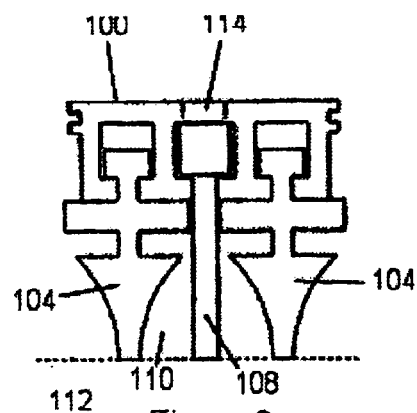
FIG. 3 is a cross section of a frame of a windshield shown with two squeegees and brush inserted in accordance with an embodiment of the present invention.
Figure 4:
FIG. 4 is a perspective view of a frame of a windshield shown with two squeegees and brush inserted in accordance with an embodiment of the present invention.

FIG. 3 is a cross section of the frame 100 with squeegees 104 and brush 108 in place. FIG. 4 illustrates a perspective view of the frame 100 with squeegees 104 and brush 108 inserted. As shown, squeegees 104 and frame 100 define a space 110 when engages with the surface of a windshield 112. Squeegees 104 are preferably flexible, and preferably made of rubber or silicon or the like. Brush 108 preferably has stiff, flexible bristles, and a perforated spine. Also, the spine of brush 108 is preferably flexible so that it can adapt to the shape of most windshields. The bristles of brush 108 are preferably selected so that they are several thousandths of an inch shorter than the squeegee blades. Thus, due the squeegees being flexible, brush 108 cones into contact with windshield 112 when the wiper is pressed against the windshield 112.

Figure 5:
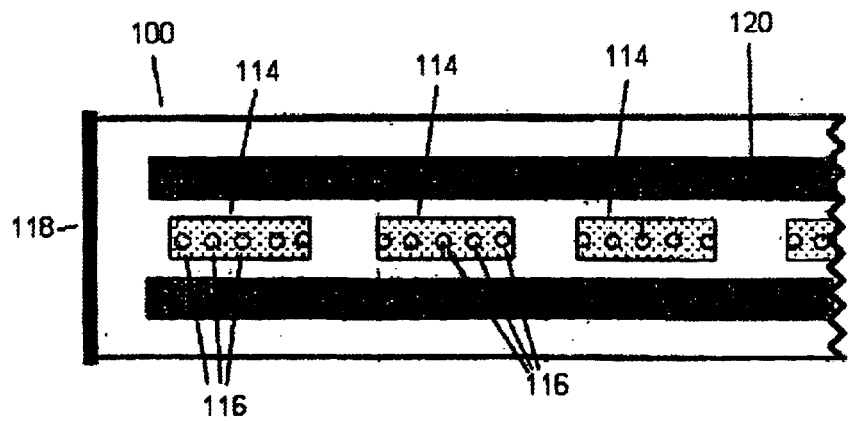
FIG. 5 is a top view of a windshield wiper in accordance with an embodiment of the invention.

FIG. 5 illustrates a top view of a wiper in accordance with an embodiment of the present invention. Frame 100 has openings 114 along the back side of the frame. Perforations 116 in the spine of brush 108 are revealed. Openings 114 are preferably located such that they are adjacent to the brush perforations 114 when the brush 108 is installed.

FIG. 5 also shows an optional end cap 118 that can be included with embodiments of the present invention. With an end cap, and preferably a constant cross section frame, wiper blades according to embodiments of the invention can be manufactured in one length, and cut to fit any vehicle. The end caps 118 are then used to retain squeegees 104 and brush 108.

Figure 6:
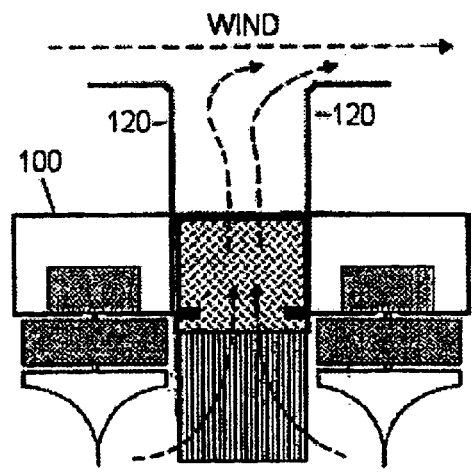
FIG. 6 is a cross section of a frame of a windshield wiper showing the flow of air in accordance with an embodiment of the present invention.

FIGS. 5 and 6 also illustrate arm engaging members 120 disposed along the back of frame 100. The arm engaging members perform two functions. First, they enable the wiper to be engaged by another assembly to allow installation with a variety of vehicles. Second, they help to create a vacuum when wind travels across the back of frame 100 as shown in FIG. 6. Due to the openings 114 in the back of frame 100, a vacuum is created that draws liquid from the windshield 112, up into the brush bristles, and out through the openings 114 as shown by the directional arrows in FIG. 6.

The brush bristles are preferably thick and dense to allow easy removal of stubborn insect deposits, bird droppings, dirt, grime and the like. This prevents the driver's visibility from being obstructed and eliminates pulling over to the roadside to manually clean the windshield of debris. The specially designed wipers are also capable of removing stubborn tree sap, road salt film, leaves, and other debris that may collect on the outside of the glass.

The windshield wipers of the present invention can have the same lengths as conventional wiper blades and can be attached into standard metal wiper arms. Unlike conventional rubber bladed wipers, however, each of the present wipers includes a brush 108 between two flexible wiper blades 104. The brush 108 contains very stiff, thick and dense bristles that are preferably made of a nylon fibrous material. The brush 108 is preferably made pliable lengthwise so that it can self-adjust to the contour of the windshield. The brush 108 is used to work loose grime and stubborn deposits as the blades 104 sweep debris away. The wiper unit is also designed to allow water or windshield cleaning solution to flow through the perforated spine of the brush and, if at traveling speed, to create a "vacuum" effect, as the back of the frame has openings 114, revealing the perforated spine on the brush 108. It should be readily understood that the windshield wipers of the present invention can be installed on aftermarket vehicles as well as incorporated into new vehicle production.

The advantages of the windshield wipers of the present invention are their ease of use, their effectiveness at cleaning, and the safety provided to motorists. Instead of being limited to standard rubber wiper blades with minimal scrubbing capabilities, the present wipers work loose stubborn insect and dirt deposits that would otherwise be bypassed. The stiff, dense nylon bristles scrub loose deposits without scratching the glass surface. This helps the driver maintain clear visibility and may even prevent accidents from occurring. Motorists can avoid continually pulling over to the roadside to manually wipe their windshields free of tough debris. This is especially helpful to commercial truck and bus drivers who operate on strict schedules and have little time for unexpected stops along the highway. It should be understood that the embodiments of the present invention are also effective for boat, marine and aircraft applications.

One of the novel features of embodiments of the present invention is the assembly's ability to advantageously utilize a vacuum effect, attracting water down into the brush. In addition, a polymer plastic channel brush is preferably used in the present design, enhancing flexibility and enabling the wiper assemblies to be manufactured in one length and cut to the end user's vehicle specifications by the end user. A cutting tool is preferably provided to the end user for after market applications. The present design preferably uses all plastic and nylon elements. After the appropriate length is cut and the unit is installed on the wiper aim, a molded frame end cap can be snapped onto the cut end of the installed wiper brush.

The use of new plastic and polymer materials, as well as other current technology, can improve the present invention even further. New plastic technology can enable the brush to attract water, as well as to resist snow and ice buildup. Heat can be provided through the frame to insure against snow and ice buildup. Aftermarket kits can route fluid from the vehicle washer reservoir directly into the wiper assembly center cavity and down into the brush.

The wiper assemblies of the present invention can be adapted to cars, SUVs, vans, pickup trucks, commercial trucks and buses, boats, aircraft, government and military vehicles, and, ultimately, any vehicle or other structure from which water and debris must be removed.

While the invention herein disclosed has been described by means of specific embodiments and applications thereof, numerous modifications and variations can be made thereto by those skilled in the art without departing from the scope of the invention as set forth in the claims.

What is claimed is:

1. A windshield wiper comprising:
   a longitudinal frame having a front side and a back side, said frame engages at least two longitudinally extending flexible squeegees and a longitudinally extending brush having a perforated spine disposed between said at least two squeegees along said front side;
   said frame further comprising at least one opening along said back side and substantially adjacent to and in communication with said brush perforations; and
   a pair of arm engaging members longitudinally disposed along said back side on opposite sides of said at least one opening along said back side.

2. A windshield wiper as in claim 1, wherein said brush comprises flexible bristles extending not past said squeegees, such that said bristles make contact with said windshield when said wiper is pressed against a windshield.

3. A windshield wiper as in claim 1, wherein said frame is an extruded plastic having a substantially constant cross section.

4. A windshield wiper as in claim 1, wherein said frame is metallic.

5. A windshield wiper as in claim 1, further comprising at least one end cap adapted to engage an end of said frame.

6. A windshield wiper as in claim 1, wherein said frame comprises a plurality of openings along said back side of said frame between said pair of arm engaging members.

7. A windshield wiper as in claim 1, wherein said pair of arm engaging members are adapted to provide a pressure differential between a space defined by said frame said squeegees and said windshield, and an outside of said frame when wind passes over said wiper.

8. A windshield wiper as in claim 1, wherein said frame is adapted to be cut to any length.

9. A windshield wiper as in claim 1, wherein said brush is a polymer plastic channel brush.

* * * * *